US010348923B2

(12) United States Patent
Tolia et al.

(10) Patent No.: US 10,348,923 B2
(45) Date of Patent: Jul. 9, 2019

(54) PRINTER CONFIGURATION FOR USE OF PRINTING MATERIAL (71) Applicant: Hewlett-Packard Development Company, L.P., Houston, TX (US)

(72) Inventors: Sovrin T Tolia, San Diego, CA (US); Rowdy K Webb, Portlanf, OR (US); Philip A Mccoog, Portland, OR (US); Diane R Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/737,114

(22) PCT Filed: Aug. 18, 2015

(86) PCT No.: PCT/US2015/045773
§ 371 (c)(1),
(2) Date: Dec. 15, 2017

(87) PCT Pub. No.: WO2017/030571
PCT Pub. Date: Feb. 23, 2017

(65) Prior Publication Data
US 2018/0131831 A1 May 10, 2018

(51) Int. Cl.
G03G 15/00 (2006.01)
H04N 1/00 (2006.01)
(Continued)

(52) U.S. Cl.
CPC ....... H04N 1/00954 (2013.01); G06F 3/1203 (2013.01); G06F 3/1229 (2013.01);
(Continued)

(58) Field of Classification Search
CPC .... G06F 3/1203; G06F 3/1219; G06F 3/1229; G06F 3/1285
See application file for complete search history.

(56) References Cited

U.S. PATENT DOCUMENTS 6,985,244 B1    1/2006  Bhogal et al.
7,084,951 B2 *  8/2006  Silverbrook ............... B41J 2/14
                                                            347/86

(Continued)

FOREIGN PATENT DOCUMENTS

CN    1700103       11/2005
EP    0799709 B1    1/2000
(Continued)

OTHER PUBLICATIONS

Presto Web page. "Automatic Supplies Subscription" Presto Services Inc.—1 page—2015.

Primary Examiner — David J Bolduc
(74) Attorney, Agent, or Firm — HP Inc. Patent Department (57) ABSTRACT A printer is operable to implement one of a subscription configuration or trade use configuration. The printer can implement one of the subscription configuration or trade use configuration. When the subscription configuration is implemented, the printer restrictively controls, at least temporarily, use of the printing material resource that is installed on the printer. When the trade use configuration is implemented, the printer provides for less or no control over the use of the printing material resource.

14 Claims, 3 Drawing Sheets (51) Int. Cl.
*G06F 3/12* (2006.01)
*G06Q 10/00* (2012.01)

(52) U.S. Cl.
CPC ........... *G06F 3/1285* (2013.01); *G06Q 10/20* (2013.01); *H04N 1/00042* (2013.01); *H04N 1/00344* (2013.01); *G06F 3/1219* (2013.01); *H04N 2201/0039* (2013.01); *H04N 2201/0082* (2013.01)

(56) References Cited

U.S. PATENT DOCUMENTS

| | | | | |
|---|---|---|---|---|
| 7,130,066 | B1* | 10/2006 | Kanematu | H04L 63/083 358/1.15 |
| 7,520,437 | B2* | 4/2009 | Daniel | G06F 21/31 235/375 |
| 7,987,494 | B1* | 7/2011 | Donahue | G03G 21/046 283/113 |
| 8,194,275 | B2* | 6/2012 | Furst | G06Q 10/0875 358/1.15 |
| 8,908,216 | B2* | 12/2014 | Dowling | G06F 21/606 358/1.15 |
| 8,911,069 | B1 | 12/2014 | Novak et al. | |
| 8,989,648 | B2 | 3/2015 | Koyama | |
| 9,058,147 | B2 | 6/2015 | Pizot et al. | |
| 9,224,137 | B1* | 12/2015 | Tomasi | G07F 17/16 |
| 9,286,456 | B2* | 3/2016 | Baldwin | H04N 21/2541 |
| 9,713,117 | B2* | 7/2017 | Khoryaev | H04W 76/14 |
| 2004/0080767 | A1* | 4/2004 | Meilstrup | G06F 3/1205 358/1.13 |
| 2005/0039091 | A1* | 2/2005 | Hanaoka | G06F 3/1219 714/724 |
| 2006/0077452 | A1* | 4/2006 | Nguyen | G06F 21/41 358/1.15 |
| 2008/0213014 | A1* | 9/2008 | Silverbrook | B41J 2/17503 399/364 |
| 2009/0132731 | A1* | 5/2009 | Nakamura | H04N 1/00204 710/19 |
| 2012/0134686 | A1* | 5/2012 | Jones | G03G 21/1892 399/12 |
| 2013/0187964 | A1 | 7/2013 | Klein et al. | |
| 2013/0194604 | A1* | 8/2013 | Asano | G06F 3/1229 358/1.13 |
| 2013/0308147 | A1 | 11/2013 | Wu et al. | |
| 2014/0215584 | A1* | 7/2014 | Webb | G06F 21/42 726/6 |
| 2014/0240755 | A1* | 8/2014 | Pizot | G06F 11/3013 358/1.15 |
| 2014/0292867 | A1 | 10/2014 | Takata | |
| 2015/0355870 | A1* | 12/2015 | Webb | H04N 1/00832 358/1.15 |
| 2015/0370518 | A1* | 12/2015 | Ramchandran | G06F 11/30 358/1.15 |
| 2016/0011554 | A1* | 1/2016 | Shipman | G06F 21/10 399/79 |
| 2016/0011827 | A1* | 1/2016 | Webb | G06F 3/1203 358/1.14 |
| 2017/0090830 | A1* | 3/2017 | Tomono | G06F 3/121 |

FOREIGN PATENT DOCUMENTS

| | | |
|---|---|---|
| JP | 2080-343790 | 12/2000 |
| JP | 2002-202697 | 7/2002 |
| JP | 2007-304861 | 11/2007 |
| JP | 2008268455 | 11/2008 |
| JP | 2009-039870 A | 2/2009 |
| JP | 2012-022549 | 2/2012 |
| JP | 2013-538716 | 10/2013 |
| JP | 2014-193531 | 10/2014 |
| KR | 10-0453395 | 5/2005 |
| WO | WO-2014120184 | 8/2014 |
| WO | WO-2014120187 | 8/2014 |
| WO | WO-2014120199 A1 * | 8/2014 ............ G06F 21/10 |
| WO | WO-2015015503 | 2/2015 |

\* cited by examiner

PRINTER CONFIGURATION FOR USE OF PRINTING MATERIAL

BACKGROUND

Increasingly, devices are equipped with circuitry and communication components for enabling connectivity. For some class of devices, the connectivity enables automated ordering of resources that such devices need to operate.

DETAILED DESCRIPTION

Numerous examples are described with respect to devices of various types and classes which use a replenishable material. As described, examples enable such devices to be operated to enable election of a consumption configuration by which a resource of replenishable material can be used and replenished on an ongoing basis. In some examples, a device implements an elected consumption configuration when a resource of replenishable material is installed or in use, so that the consumption configuration is applied to the resource that is installed or in use.

In examples describe, terms "consumption configuration" or "configuration for a consumption plan" (e.g., "configuration for a subscription plan" or "configuration for a trade use plan") refers to machine or device-implementation of logic, such as provided by programming or firmware, to control aspects of how a machine consumes a replenishable material. As examples, the consumption configuration can include rules or other logic relating to the use of replenishable materials, such as rules or logic which determine a type, designation or characteristic of a resource of replenishable material in accordance with a consumption plan.

Numerous examples provide for alternative consumption plans or configurations for replenishable materials and resources. In examples, a device can be operated to select a consumption plan, and then have restrictions of the consumption plan made applicable to replinshable material that is in use or available for use with the device.

Examples of consumption plans include subscription plans and trade use. Subscription plans generally involve a periodic or as needed shipment or resupply of the replenished resource from an external source, in accordance with rules on quantity and pricing. Trade use means the current supply can be used without restrictions on use, and is generally equivalent to an outright purchase by the user of the quantity of the supply.

According to some examples, a printer is operable to implement one of a subscription configuration or trade use configuration. When the subscription configuration is implemented, the printer restrictively controls, at least temporarily, use of a printing material resource that is installed on the printer. When the trade use configuration is implemented, the printer provides for less or no control over the use of the printing material resource.

According to some examples, a printer includes a retention component, a dispenser, and a controller. The retention component retains a resource of printing material (e.g., cartridge of ink or toner). The dispenser can operate to dispense a print layer on a medium using printing material of the retained printing material resource. The controller operates to make a determination as to whether the printer is opted into or out of a subscription plan. If the determination is that the printer has opted in to the subscription plan, the controller implements a subscription configuration that controls the dispenser with respect to use of the printing material resource. If the determination is that the printer has opted in to the trade use plan, then the controller implements a trade use configuration that provides for less or no control of the printing material resource.

Aspects described herein provide that methods, techniques and actions performed by a computing device are performed programmatically, or as a computer-implemented method. Programmatically means through the use of code, or computer-executable instructions. A programmatically performed step may or may not be automatic.

Aspects described herein may be implemented using programmatic modules or components. A programmatic module or component may include a program, a subroutine, a portion of a program, a software component, or a hardware component capable of performing stated tasks or functions. In addition, a module or component can exist on a hardware component independently of other modules or components. Alternatively, a module or component can be a shared element or process of other modules, programs or machines.

Furthermore, aspects described herein may be implemented through the use of instructions that are executable by a processor or combination of processors. These instructions may be carried on a non-transitory computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

Figure 1:
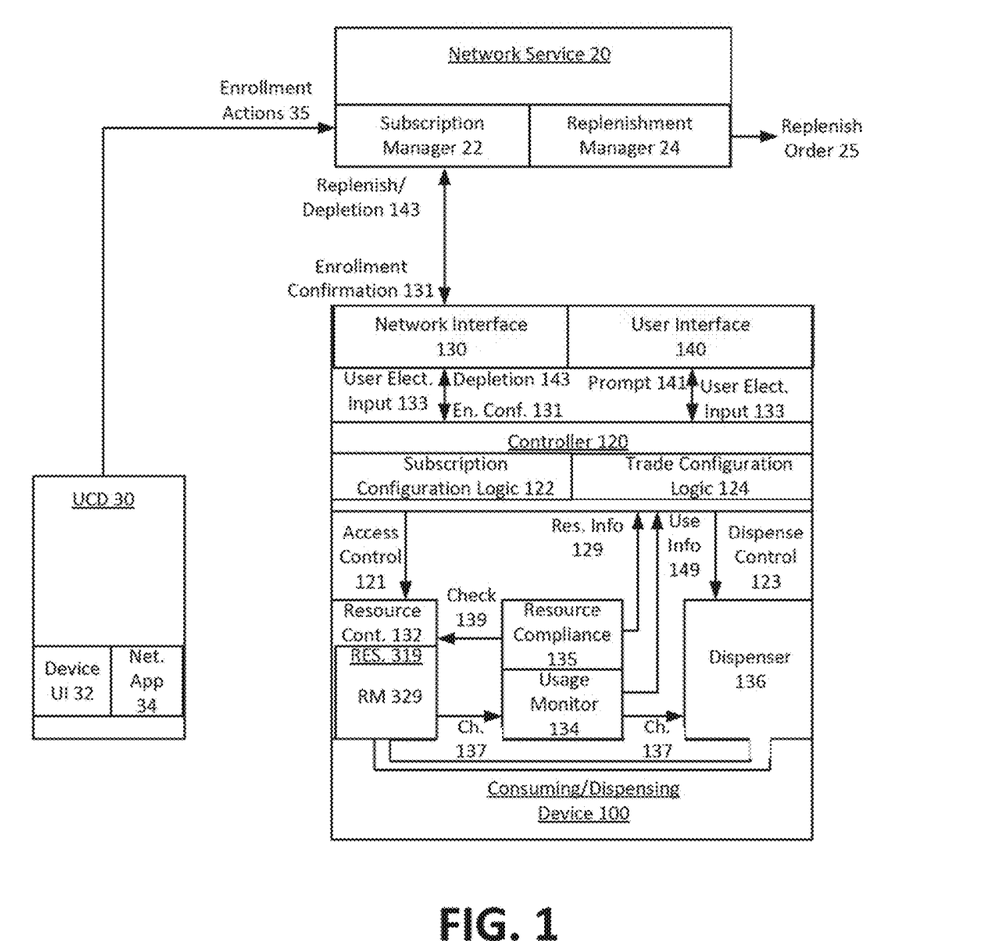
FIG. 1 illustrates an example device to operate and elect a subscription or trade use configuration for replacing a replenishable material.

FIG. 1 illustrates an example device to operate and elect a subscription or trade use configuration for replacing a replenishable material. In an example of FIG. 1, a consuming and/or dispensing device (alternatively referred as "consuming/dispensing device 100" or "device 100") represents any given device from a variety of device classes which is operable to consume and/or dispense a replenishable material. In variations, the device 100 can be of a type or class that utilizes a liquid resource (e.g., ink), a powder or other solid resource (e.g., polymeric film, metal wire), gaseous resource (e.g., carbonation canister), a specialized manufactured device or component that may be subject to degradation or wear (e.g., specialized cleansing cloth or filter). By way of example, device 100 can correspond generally to a printer or copier, a cleansing device, an appliance, a filtering, a food or drink preparation device (e.g., a coffee maker), or a dedicated dispensing device (e.g., for human hand soap). Examples of FIG. 1 illustrate device 100 receiving or retaining a resource 119 of replenishable material 129. The resource 119 can correspond to a cartridge, canister, or other structural element which retains the replenishable material.

In some examples of FIG. 1, the device 100 can be opted for a particular consumption or dispensing configuration that will control aspects of how the replenishable material will be replenished and used in the future. According to one aspect, the device 100 can be equipped with the resource 119 of replenishable material 129 (e.g., cartridge of ink or detergent) when the device is in a non-committed state. In a non-committed state, a device is not committed to any particular consumption plan. An example of a non-committed state is an initial state or use of the device, such as the first instance when the device is made operational after taken out of a manufacturer's packaging (e.g., "out-of-the-box"). When in a non-committed state, the device 100 may have limited or restricted use of the replenishable material, until the device is elected for a particular consumption plan. In some examples, the device 100 can be elected for either a subscription-based replenishment plan, or for trade use consumption plan. If the device 100 is elected for trade use, the device 100 operates to eliminate the limitation or restriction on the resource 119 of replenishable material 129. For example, the device 100 can instantly operate in a state which enables full access and use of the installed resource 119. Thus, for example, when the trade use is selected, an installed cartridge (or other type of resource for providing replenishable material) can be instantly accessed and used by the device 100 without, for example, use restrictions.

If the device 100 is elected for the subscription plan, however, the device 100 may maintain or further a limitation or restriction to the resource pending confirmation that the user has performed necessary actions to enroll in the subscription plan. For example, the device 100 may restrict any operation which may involve use of replenishable material from the resource until the device 100 receives confirmation (e.g., message from remote network source) that the user has completed an enrollment for the elected subscription plan. Once the confirmation is received, the device 100 may permit use of the resource. In some variations, the device 100 uses the resource under parameters which meter and control usage of the resource.

In some examples, the device 100 operates in cooperation with a network service 20 to manage a consumption plan (e.g., subscription plan). The network service 20 can be implemented as, for example, a server or combination of servers that are accessible to the device 100 over the Internet. The network service 20 can alternatively be implemented through a computer that is accessible as a peer, or through a direct network connection. The network service 20 can maintain, for example, a user account, consumption or dispensing rules of the account, and user information such as shipping and credit card information. The network service 20 can also include a subscription manager 22 which can perform operations such as sending the device 100 a confirmation message that the user's enrollment in a subscription plan is complete, or in good standing.

In some variations, the device 100 may communicate with, prompt or guide the user through communications with a user's computing device 30, in order to trigger the user in electing one type of consumption or dispensing configuration over another. For example, the user can elect by direct or local input to have the device 100 on a subscription plan. When the user indicates his intent, the device 100 may restrict use of the resource 119 until the user completes enrollment with the subscription manager 22. The controller 120 may, for example, implement a preclusive condition which precludes use of the installed resource 119 until confirmation is received that the device (or user) has been enrolled.

With reference to FIG. 1, the device 100 includes a controller 120, a network interface 130, a user interface 140, a resource container 132, and a dispenser 136. Additionally, in an example of FIG. 1, the device 100 includes a set of control and/or monitoring mechanisms, shown as usage monitor 134 and resource compliance 135, for controlling use of the replenishable material. The resource container 132 can retain the resource 119 of replenishable material 119, such as may be provided by a specialized container or cartridge. The resource 119 can provide a quantity of the replenishable material 129 that can be consumed or dispensed via the dispenser 136. The resource 119 can be replaced or refilled in order to replenish the material 129 (e.g., detergent, liquid ink, powder, etc.). In some variations, the resource container 132 and the dispenser 136 are integrated as a single component or module, while in variations, the resource container 132 and dispenser 136 are distinct or separate components.

The device 100 may utilize an internal or external power source to power and enable communications through the network interface 130, as well as to enable the various operations implemented through the controller 120. The size and type (e.g., internal or external) of power source can be determined by the size and/or operational environment of the device 100. For example, as a printer, the device 100 can be equipped with resources for receiving external power, while as a portable cleaning device may be battery operated.

By way of example, the network interface 130 can include a physical connection or network port, or alternatively a local wireless communication port (e.g., Bluetooth, Bluetooth LE, or variants; 802.11(a), (b), (g), (n) or Direct Wi-Fi, etc.). Still further, the network interface 130 can include a cellular port to connect with the network service 20.

The user interface 140 can correspond to one or more physical components, such as a display screen, touch-screen, button or button set, or LED interface (e.g., set of discrete LEDs). The size and type of user interface can also be based on the size and type of the device 100. For example, as a printer, the device 100 may use a touch-screen and a button set, while as a handheld cleansing device, the device 100 may utilize an LED or set of LEDs.

The controller 120 can operate to implement one of multiple possible consumption or dispensing configurations for restricting use of replenishable material by the dispenser 136. In particular, the controller 120 can commit the device 100 to one of multiple available consumption plans (e.g., subscription plan or trade use), based on, for example, a user election or preference, or alternatively, based on a default election. The controller 120 may commit the device 100 to one of the subscription plan or trade use plan by persistently implementing a corresponding configuration for the subscription plan or trade use plan that is elected. When the configuration is implemented, the controller 120 may control the device 100 in using the replenishable material based on a rule set of the consumption plan. For example, when the subscription plan is elected, the controller 120 may control how the device 100 uses the replenishable material, so that the device's use of the replenishable material will be in accordance with a set of rules of the subscription plan. Moreover, the controller 120 can implement the control over the replenishable material without an ability of a user to manually bypass or override control of the replenishable material by the device 100. The configuration of the consumption plan can be applied to the replenishable material that is in use, installed or otherwise retained by the resource container 132. The device 100 may persistently implement the configuration so that the configuration of an elected consumption plan remains in place on the device after the device is used and reused (e.g., switched on/off). Furthermore, when the device 100 is committed to a consumption plan, the implemented configuration for the consumption plan remains persistent on the device 100, and the implemented configuration controls aspects of how the existing and subsequently used replenishable material can be replenished or otherwise replaced.

In one variation, the controller 120 can include programming or logic which can implement a configuration plan based on, for example, user election of a consumption plan. For example, the controller 120 can be manufactured or shipped with programming that can be triggered when the device is first turned on. The programming or logic can then execute to trigger the user to further make the election, as well as to persistently implement the particular configuration when elected. In variations, the controller 120 can communicate with the network service 20 to receive some or all of the instructions or data for implementing operations of triggering the user or implementing a configuration of an elected consumption plan.

Still further, some or all of the instructions or data for implementing operations of (i) triggering the user or (ii) implementing the configuration of the elected consumption plan, can originate from the resource 119. For example, the resource 119 can include an electronically-readable tag or marker which identifies configuration parameters and/or locates a network location where the configuration or data for configuring the device resides. In variations still, the resource 119 can store computer-readable instructions in a communication interface (e.g., near-field communication ("NFC") medium or physical connector). When the resource 119 is installed or coupled to the device 100, device 100 can interface with the resource 119 using the communication interface in order to obtain the instructions and/or configuration parameter for triggering the user to make the election and/or configuring the device 100.

In some variations, the device 100 can be recommitted to an alternative consuming/dispensing configuration through communication or control with the network service 20 and/or user computing device 30. For example, the user can operate the computing device 30 to access a user account and change a usage plan for the resource 119. In order to alter the consumption or dispensing configurations, the computing device 30 may send a communication to the device 100, or alternatively, enable the device 100 to verify that a change in the consumption or dispensing configuration is proper. The computing device 30 can, for example, authorize the commitment or recommitment of the device 100 to a particular consumption or dispensing configuration.

According to an example of FIG. 1, the controller 120 is able to implement a consumption or dispensing configuration that corresponds to one of a subscription configuration or a trade use configuration. When the controller 120 implements the subscription configuration, the controller 120 (i) monitors and controls for consumption of the replenishable material 129, and/or (ii) triggers a replenishment order 25 via the network service 20 to initiate a subscription delivery that replaces the resource 119 of replenishable material when a replenishment threshold is met. The replenishment threshold can, for example, be based on an amount of replenishable material remaining with the device 100. The replenishment threshold can correspond to a value where, for example, the device 100 anticipates depletion and triggers the replenishment order 25 so that replenishment is received soon or just before when depletion is likely to occur. Under a subscription plan, the replenishment threshold can be either preset or intelligently determined, based on, for example, a consumption or depletion rate of the replenishment resource. When the controller 120 implements the trade use configuration, the usage of the replenishable material resource 119 is not controlled or subjected to subscription-based replenishment. In an example of FIG. 1, the controller 120 can be committed to one of the subscription configuration or trade use configuration, and the implemented configuration can be applied with respect to use of the replenishable material which is present and/or available for use in the device 100 at that time. Thus, the selection of the subscription or trade use configuration can occur after when the resource 119 of replenishable material 129 is installed or otherwise retained by the resource container 132, and the subsequent usage of the existing resource may then be determined and implemented in accordance with the selected configuration. As a variation, the selection of the subscription or trade use configuration can be made when the device 100 is being used for the first time, such as after an out-of-the-box event, where the device is packaged or equipped with an installed resource of replenishable material.

As shown, the controller 120 includes subscription configuration logic 122 and trade configuration logic 124. The subscription configuration logic 122 implements rules and parameters for a subscription plan that the device 100 is enrolled in. The controller 120 can trigger or initiate user action to elect that device for a given subscription plan by which the replenishable material that is dispensed from the device 100 can be monitored and controlled for replenishment and/or quantity of use. Once the device 100 is enrolled in the subscription plan, the subscription configuration logic 122 can cause the controller 120 to interface with the set of control and/or monitoring mechanisms in order to approximate a consumed quantity of the replenishable material and/or an amount of replenishable material that is remaining. In one implementation, the subscription configuration logic 122 can cause the controller 120 to signal dispense control 123 to the dispenser 136. The dispense control 123 can limit or disable an ability of dispenser 136 to consume or dispense the replenishable material from the resource container 132. The subscription configuration logic 122 can trigger the limitation in use (e.g., via the dispense control 123) based on, for example, a determination that an amount of replenishable material that has been consumed in a given time period or milestone exceeds a quantity specified by the subscription plan of the device 100. The consumed amount of replenishable material can be determined from the usage monitor 134, which can be implemented using a variety of mechanisms. In one implementation, the usage monitor 134 includes a sensor set for detecting characteristics 137 of the replenishable material which is retained or used by the device 100. For example, the usage monitor 134 can measure an amount of replenishable material remaining with the resource container 132 (or with the cartridge, carrier or other installed/retained mechanism).

In one example, the usage monitor 134 can be provided to detect individual instances when the resource 119 is used. In variations, the usage monitor 134 can be implemented to sense or detect an amount of replenishable material 129 that is used or needed. In variations, the usage monitor 134 can be implemented in part or in whole with the replenishment material resource 119. For example, the usage monitor 134 can correspond to (i) a presence sensor which can detect a level of replenishable material 129 remaining with the resource container 132 (e.g., an amount of fluid, powder, or paste in a cartridge), (ii) an optical sensor that can optically sense a dimension or characteristic of the resource container 132 or its content, and/or (iii) a weight sensor that interfaces with the resource container 132 to determine a weight of the replenishable material 129. As an addition or alternative, the usage monitor 134 can correspond to a physical or logical component that iteratively counts or otherwise aggregates a number of usages from the replenished material. For example, in the case where the device 100 is a printer, a counter logic can be provided with the printer to count a number of sheets which are printed.

The usage monitor 134 can signal usage information 149, corresponding to sensor input and/or aggregation information, to the controller 120. In turn, the controller 120 can selectively signal to control the dispenser 136. The controller 120 can use the usage information 149 to determine when the resource container 132 is depleted of replenishable material. The determination that the resource 119 of replenishable material 129 at or near a point of depletion can be based on, for example, a measure of usage (e.g., a count or aggregation of the number of instances and/or amount of material used), and/or a measured quantity of replenishable material 129 that is consumed or dispensed from resource container 132 (or conversely remaining in the resource container 132).

In aspects, the network service 20 can operate with the device 100 to trigger a replenishment when the amount of replenishable material 129 remaining meets a replenishment threshold that anticipates depletion. In variations, the device 100 can also a trigger replenishment when depletion of the resource 119 is determined. The controller 120 can signal a replenishment or depletion event 143 to the subscription manager 22 via the network interface 130. In an example of FIG. 1, the subscription manager 22 can signal a replenishment manager 24 to implement a replenishment order 25 for the device 100. In some implementations, the controller 120 can also implement local or network-triggered control to limit access to the dispenser 136 and/or the replenishable material based on determined limits set by, for example, the selected subscription plan.

The trade use configuration logic 124 implements rules and parameters for the trade use configuration. In some examples, the rules and parameters of the trade use configuration logic 124 may preclude use of replenishable material resources which are of a particular origin, type, or designation. For example, the trade use configuration logic 124 can preclude use of a cartridge, container or other carriage which originates from a subscription source, is of a dimension (e.g., quantity) or with other characteristic that is indicative of being a subscription only resource, or is marked or otherwise designated for the a subscription plan. The trade use configuration logic 124 can cause the controller 120 to interface with the resource compliance 135 to check 139, for example, a carriage (e.g., ink cartridge) containing replenishable material that is for permitted use. The resource compliance 135 can automatically perform a check 139 of a replenishment resource (e.g., cartridge) when, for example, the resource container 132 is opened, or detected as receiving a new replenishment resource (e.g., new cartridge installed). In the event corresponding resource information 127 signaled from the resource compliance 135 indicates a non-permitted resource as being retained or installed within the resource container 132, the controller 120 can signal access control 121 to the resource container 132 (or dispenser control 123 to the dispenser 136), in order to limit or preclude access or use of the replenishable material from the non-permitted resource.

In an implementation, the determination of which consumption or dispensing configuration is implemented is based on user action and intent. The device 100 can operate to facilitate or promote the user election of one configuration over another. The controller 120 can prompt, guide or otherwise facilitate the user to elect to enroll the device 100 in a subscription plan. For example, the controller 120 can signal a prompt 141 (e.g., a message notification, blinking light, sound or chirp, etc.) to the user through the user interface 140. In some examples, the user enrolls in a given subscription plan using the network service 20. The network service 20 may include a subscription manager 22 to interact with the user in providing a subscription plan. For example, the subscription manager 22 can receive the user input/election for a particular subscription plan (e.g., based on the user needs), receive the shipping location (or site of device 100), as well as payment information, so that the user's account is charged automatically in accordance with delivery of replenishments.

In one implementation, the network service 20 can trigger a local alert or notification to have the user provide input for opting in or out of a subscription plan. The alert or notification may simply indicate that a subscription plan is available, without providing specifics of the subscription plan. In variations, the alert or notification may identify specifics of one or more subscription plans, and further link the device 100 or the user computing device 30 with the subscription manager 22 to facilitate enrollment. In one implementation, the network service 20 implements the subscription configuration once a corresponding user input is received at either the device 100 or network service 20. The implementation of the subscription plan may result in the device 100 having limited use pending completion of the user's enrollment in the subscription plan. For example, the device 100 may be locked from use, or be provided limited use (e.g., limited for a duration, limited by capability, etc.) until the user's subscription enrollment is complete (e.g., the user provides billing and shipping information to the network service 20, and/or the user accepts contractual terms of the subscription plan). If the user's local input elects to opt in for the subscription plan, then the user may be prompted to independently access a network site associated with the network service 20 in order to complete enrollment in the subscription plan. The enrollment can be completed by, for example, the user providing credit card information and/or a shipping address for receiving replenishments, as may be directed by the subscription manager 22 of the network service 20.

In some implementations, if the user provides local election input 133 via the user interface 140 (e.g., user contacts touch-screen or presses button) that indicates the user's election for a given subscription plan, the controller 120 implements the subscription configuration for the device 100. In implementing the subscription configuration, the controller 120 may disable or limit use of the device 100 until an enrollment confirmation 131 is received from the network service 20. The enrollment confirmation 131 can verify that the enrollment of the device 100 (or user) has been completed. The subscription manager 22 can signal the confirmation 131 to the device 100 over the Internet, and the controller 120 may receive the confirmation 131 via the network interface 130. Absent receipt of the confirmation 131, the controller 120 can signal controls 121, 123 to the subscription configuration logic 122 and/or trade use configuration logic 124, so as to limit the use or accessibility to the replenishable material 129 that is retained in the device 100. In some implementations, a user's failure to take further action and complete the subscription plan can cause the network service 20 to switch from the subscription configuration to the trade use configuration. Likewise, in some variations, if the user fails to make an election as between subscription or trade, a default election (e.g., trade) can be made.

In similar fashion, if at a subsequent time the user's credit card is expired, or some event occurs which affects the subscription, the network service 20 can signal a notification to the device 100 to limit use of the device until the user takes additional steps to continue the subscription. The controller 120 can receive the notification and respond with controls 121, 123 which limit the use or accessibility of the resource 119.

Still further, in some implementations, the computing device 30 can include one or more applications, including a device user interface 32 and a network application 34, for enabling or facilitating the user communicating with the device 100 or the network service 20, respectively. For example, the device user interface 32 can receive prompts from the device 100, and the user can operate the network application 34 on the computing device 30 in order to input enrollment actions 35 with the subscription manager 22 of network service 20.

Still further, in some variations, the device 100 can utilize multiple resources 119, either at one time or in substitution of one another. Furthermore, the resources can be of different types. For example, in the case where the device 100 is a printer, the resource 119 can correspond to a color ink cartridge and a black/white ink cartridge (e.g., both types of cartridges may be supplied to the user at time of shipment). Both types of cartridges may be used together, but the user's desire for a subscription plan may extend to only one of the two types of resources which are used by the device during its operation. In such variations, the user's election of a use plan can be made specific to a particular resource 119 or to a particular type of resource. For example, in the case of the printer, the user may elect a subscription plan for only the black/white ink and leave color for trade use. In such cases, the device 100 can operate under a subscription configuration for the specific type of resource 119 of the user's election, while other types of resources may be used in accordance with the configuration for an alternative consumption plan.

In variations, the device 100 can utilize resources of replenishable material of different types on a selective basis, in place of another type of replenishable material. For example, when the device 100 corresponds to a washing machine, the user may substitute normal or default detergent for specialized scented detergent, but only for certain loads (e.g., heavy duty loads, or loads for a particular member of the family). Likewise, with printers, the user can selectively replace color ink jet set with metallic variations for special print jobs (e.g., Christmas cards). In such cases, the user can elect the subscription plan for one type of resource 119 and not the other. For example, the user can elect for the device 100 to receive a specialized resource (e.g., scented laundry for washing machines; specialized ink for printers) on a subscription plan, while the other type of resource (e.g., every day detergent or black ink) is acquired under a trade use plan. In such instances, the device 100 can implement the subscription configuration for the particular type of resource 119 when that resource is in use.

Figure 2:
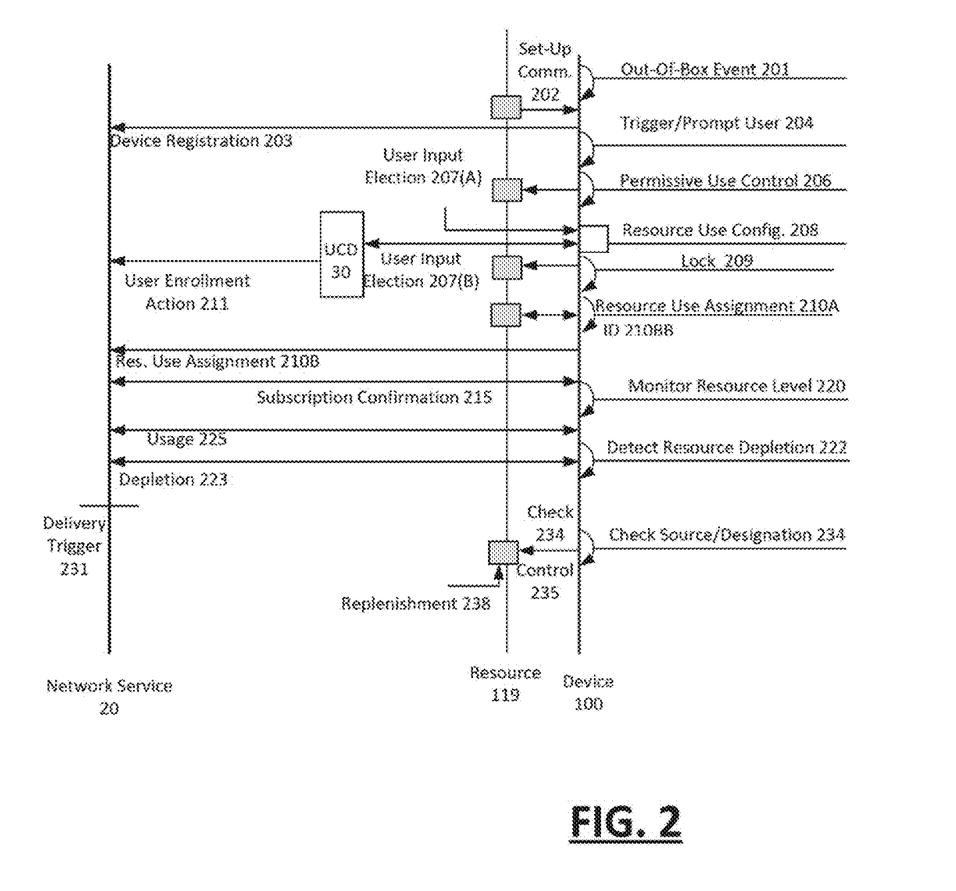
FIG. 2 illustrates an example communication diagram for operating a resource consuming and dispensing device.

FIG. 2 illustrates an example communication diagram for operating a resource consuming and dispensing device. Accordingly, in describing FIG. 2, reference is made to components of FIG. 1 for purpose of illustrating suitable components for implementing functionality as described.

With reference to an example of FIG. 2, the device 100 can detect a first in time use, such as provided by an out-of-box event (e.g., when the device 100 is initially opened and operated). The device 100 can detect the out-of-box event (201) (or its first use). In this state, the device may include or be provided (e.g., in box) with a resource 119 of replenishing material (e.g., installed cartridge). In some implementations, when the device 100 is first used, the device 100 establishes wireless connectivity and communicates with the computing device 30. Still further, the device 100 can send a registration communication (203) to the network service 20 over a wireless link (e.g., Wi-Fi). Additionally, the device 100 can initiate a process to trigger or prompt the user to elect to be part of a subscription plan (204). The prompts, for example, can be displayed or signaled to the user through the user interface 140. In variations, the prompts can be triggered or otherwise provided to the user view the computing device 30. In some variations, the device 100 can implement permissive use control (206) to permit use of the replenishable material before the user makes any election for or against enrolling the device 100 in a subscription plan. The controller 120 can, for example, signal control mechanisms of the controller 120 to permit use of an existing replinshable material resource 119 (e.g., ink cartridge). The permissive use control (206) can be subject to conditional logic, such as passage of time, or amount or type of use which occurs with the resource of replenishable material. In variations, alternatives to permissive use control (206) can include control to deny normal or expected use, or any use of the device 100.

In an example of FIG. 2, the user can make an input election (207A) locally, using, for example, the user interface 140 of the device 100. For example, in the case when device 100 is a printer, the user can respond to a prompt provided through a touchscreen interface, selecting to enroll in a subscription plan. However, examples also contemplate that the device 100 is not suited for displaying all of the subscription plan information, or receiving necessary input from the user (e.g., shipping address and credit card information). For example, in the case when the device 100 is a printer, the touchscreen may be relatively small and difficult for the user to provide input that has a significant number of characters. Likewise, the device 100 may correspond to numerous types of devices, which generally may not be equipped or suited for significant user interaction, let alone having resources to permit significant network interaction and processing for purpose of managing subscription plans and accounts.

An example of FIG. 2 also illustrates a variation in which a user operating the computing device 30 can provide an input selection 207(B) for a particular consuming/dispensing configuration. The input selection 207(B) can be entered locally through, for example, the user interface 140 of the device 100. By way of example, the device 100 can initiate an out-of-the box process to locate and communicate with the computing device 30 of the user. Once the computing device 30 and device 100 are paired, the user may be able to operate the device user interface 32 as an interface for entering election and/or providing information for opting in or out of a subscription plan. The device user interface 32 can communicate directly with the device 100, and/or communicate indirectly via the network service 20.

In some examples, the user's input of a particular configuration, such as the subscription configuration, results in the device implementing the configuration for the resource usage (208). When the user elects to enter a subscription plan, the device 100 can implement a two (or multi) part process in which usability of device 100 (e.g., access to the replenishing resource) is limited or precluded until the user completes the enrollment process for the subscription plan (e.g., the users provides credit card information and shipping address for the subscription plan; agrees to contract till terms of the subscription plan; etc.). In an example of FIG. 2, the user can enroll in a subscription plan by performing an enrollment action (211) with respect to the network service 20. By way of example, the user can interact with the user interface 140 to enter a subscription input, then access a website of the subscription manager 22 for the network service 20 to enter payment and shipping information, agree to contractual terms, and/or perform other required steps for enrolling in the subscription plan.

Until enrollment is complete, the device 100 may limit or restrict use of the resource 119. In an example of FIG. 2, the device 100 signals a lock (209) to the resource container 132 (or dispenser 136), precluding dispensing from or access to the resource 119 and the existing replenishable material. By locking the resource container 132, for example, the user is prevented from operating the device under a subscription plan, without actually enrolling in the subscription plan. In this way, the user is precluded from, for example, from bypassing or overriding the rules of the subscription plan, as the resource container 132 can be controlled to physically preclude unauthorized access by the device or even by the user. The lock (209) can permit subscription-based use for a given period of time (e.g., a day) before restricting or locking the user out.

Further in an example of FIG. 2, the network service 20 communicates a subscription confirmation (215) to the device 100. The device 100 may receive the subscription confirmation (215) directly from the network service 20, or indirectly via the computing device 30. Variations to subscription confirmation (215) are also possible. For example, the user may be provided a passcode to unlock the subscription plan, where the passcode is preprogrammed into the device 100.

In the case where the user elects out of the subscription plan, an example provides that the resource usage configuration (208) implements a trade use configuration on the device 100. The trade use configuration can minimize (in some instances even remove) restrictions which may otherwise be present with a subscription plan. For example, when the device 100 is a printer, the subscription configuration can activate a monitor to count pages, while the trade use configuration may deactivate or ignore the page count monitor. The trade use configuration may limit, however, the replenishing material resource that can replace the existing resource 119. For example, when the trade use configuration is implemented on the device 100, the user may be limited to purchasing replenishing material resources (e.g., print cartridges, filters, liquefied soap, etc.) that are not from a particular source, of a particular type (e.g., extra quantity), or otherwise designated for alternative configurations of the device 100.

In an example of FIG. 2, the operations (202)-(212) illustrate a setup process for the device 100. The particular manner in which the setup process can be performed may vary depending on implementation. Moreover, the sequence described can also vary, and operations as described can be substituted for subsequent operations or skipped altogether. Once the configuration is set, the device 100 can operate in accordance with rules and parameters of the implemented configuration.

In some variations, the device 100 includes locally stored data ("set-up data") which enables execution of instructions for implementing, for example, operations of the set-up phase process. In variations, the data set-up data can originate from a source other than the device 100, such as for example, the user computing device 30, the network service 20 (or another network service), or the resource 119 when the resource is installed in the device 100. In FIG. 2, set-up communication (202) illustrates a variation in which the resource 119 (e.g., a cartridge) uses a communication interface (e.g., NFC or electrical connector) to interface and communicate with the device 100. For example, the resource 119 can include memory that is accessible to the controller 120 via the communication interface of the resource 119 (and a corresponding communication interface of the device 100). The controller 120 can initially be programmed to detect the resource 119, and then to interface and retrieve instructions and/or data for implementing the setup process, represented by the set-up communication (202). In variations, the resource 119 can locate a network location for the controller 120, from which the controller 120 can retrieve (e.g., via network interface 130 or the user computing device 30) some or all of the instructions for implementing the set-up process.

Further under the subscription implementation, a resource replenishment threshold may be detected (222). Once detected, the replenishment signal (223) can be communicated to the replenishment manager 24 of the network service 20. The replenishment manager 24 can generate a delivery trigger (231), which results in shipment of a replenishing material resource. The implementation of the subscription configuration can also trigger additional or different communications from the device 100 to the network service 20. For example, the usage amount (225) or level of the replenishing material on the device 100 can be communicated to the network service 20, for purpose of adjusting or determining a price of the usage under the subscription plan. Still further, the usage amount (225) can also be communicated to the network service 20, or maintained internally to control or limit the amount of usage available on the device 100.

If the subscription configuration is implemented, the supply or usage amount (225) of the replenishable material 129, as provided by the resource 119 in use, can be monitored by internal operations of the device 100. In the case of printers, the controller 120 can monitor amounts of printing material used (e.g., ink, powder), amount of printing material remaining, and usage count (e.g., pages printed). In the case of cleansing equipment, the controller 120 can also monitor for the amounts of cleansing material that is used or remaining and/or a number of usages which may be context specific (e.g., washing machine loads, dishwasher load, time during which floor mop is on; etc.).

In either of the subscription or trade use configuration, the device 100 can operate to check (234) the resource 119 (when inserted or installed (238)) for compliance with rules of the implemented configuration. When, for example, the trade use configuration is implemented, the check (234) can include determining type, source or designation of the replacement. In some implementations, the check (234) can seek to identify replacements which are designated for use under a subscription plan, or alternatively, from an authorized source. When the subscription configuration is implemented, the check (234) can serve to ensure that the replenishment installation (238) is for a replacement resource that is provided under the subscription plan of the device 100. The device 100 can also implement a control (235) to preclude use of a non-authorized replacement resource should the check (234) identify its presence within the resource container 132. The check (234) can entail the device 100 interfacing with the resource 119 (e.g., cartridge) in order to identify code or markings of the resource 119 which reflect information about the 119. The code or markings can represent, for example, data bits and may be physically formed or provided on the exterior of the resource 119. The code or markings may alternatively be communicated from the resource via a communication interface with the device 100.

In some examples, the resource 119 may receive a use assignment or designation in place of or with the device 100. For example, the resource 119 can have a neutral or non-assigned state, reflecting that the resource 119 is either not in use, or in use with a device that is non-committed as to a consumption plan. Once the election of a consumption plan is made, as described below, the device 100 can signal a resource use assignment (210A/210B) to the resource 119 and/or the network service 20 to, so that the use assignment of the resource 119 to coincide with the elected consumption plan.

In one implementation, the resource 119 may include an ability to carry or hold a designation of use for a particular consumption plan, and further the designation can be determined and set when the resource 119 is installed in the device 100. For example, the resource 119 can correspond to a cartridge which carries a fluid, paste or powder. Prior to installation, the resource 119 may carry information that manifests the device as non-committed. Once the user election is made, the information can be changed so that the device manifests in accordance with the consumption plan selected by the user. For example, the device 100 can send a resource use assignment signal 210A to the resource 119 that then sets the use of the resource to conform with the elected consumption plan made by the user. Once the resource use assignment signal 210A is signaled to the resource 119, the resource 119 may be permanently assigned, so that its removal and installation with another device would not change the use assignment (e.g., subscription plan) of that device. In variations, the use assignment may reflect the current permitted or enabled use of the resource 119, and the use can be manifested from a given printer from either the resource 119 or from the network service 20 which may communicate with the given printer. Thus, the current assignment of the resource 119 can be changed at a later time, pending some additional action by the user (e.g., user performs an action to re-assign the resource 119).

According to examples, the resource 119 can include exterior characteristics (e.g., surface features on housing of cartridge) which reflect the state or use of the resource 119. In examples, the device 100 may assign the use of the resource 119 by altering the housing feature to reflect data bits coinciding with the elected consumption plan. For example, the resource use assignment signal 210A can correspond to a laser or other signal which can activate a material on the housing of the resource 119. The housing of the resource 119 can be activated to conform to a desired characteristic of shape or appearance, reflecting data bits of information (e.g., newly assigned use).

In examples, the device 100 may assign the use of the resource 119 by communicating the resource use assignment signal 210A as a data signal. For example, the device 100 may communicate with the resource 119 via an NFC interface that is provided on each of the device and the resource 119. The resource 119 (e.g., cartridge) can include an internal signal receptor and memory element (e.g., NFC tag) to hold data reflecting the use assignment of the resource 319.

Still further, in some examples, the resource use assignment for the resource 119 (e.g., ink cartridge) can be determined and maintained using a network service (e.g., network service 20). In variations shown with FIG. 2, the device 100 can perform a resource identifier operation (210BB), corresponding to a scan or communication exchange with the resource 119. An identifier of the resource 119 can be determined (e.g., serial number, SKU). Once the election of the resource 119 is made (e.g., at the completion of the setup process), the device 100 sends the resource use assignment 210B as a network communication to the network service 20. The network service 20 can maintain a database or store that associates the identifier of individual resources with a use assignment. The resource use assignment communication 210B updates the network service so that the identifier (e.g., SKU) of the installed resource 119 (e.g., cartridge) is given a use assignment that corresponds to the election of the consumption plan on the device 100. The device 100 may be programmed to check with the network service 20 to determine that the use assignment of the installed resource 119. For example, the resources 119 can be configured or otherwise used with devices that perform a check with the network service 20 to determine whether the device's use of the resource 119 is in conformance with the use assignment of the resource 119.

As shown by examples in which the resource 119 is assigned a use after installation (210(A), 210(B), 210(BB)), a manufacturer can manufacture resources 119 that are not designated as inventory for one type of consumption plan or another. Rather, a manufacturer can manufacture a collective inventory of resources for multiple consumption plans, and then let demand for particular consumption plans set the respective inventory of resources 119 for each plan.

Moreover, the manufacturer can protect the resources 119 against misappropriation or unauthorized use. For example, the resource 119 can have a large supply of replenishable material (e.g., ink) relative to what would otherwise be available to customers for purchase as trade use. The manufacturer can provide the resource 119 with larger quantities of replenishable material for subscription use. At time of purchase, the resource 119 can have a subscription use quantity of material, without having a subscription use assignment, on the premise that the user will elect a subscription based consumption plan. As described below, if the user elects the subscription plan, the device 100 can operate with the resource 119 and/or network service 20 to set the use assignment of the resource 119. The device 100 can then implement the subscription plan, and the manufacturer can charge the user appropriately for the resource 119 based on the elected subscription plan. Furthermore, the user's use of the resource 119 (with the larger supply) can be monitored and controlled to ensure overuse does not occur. If, on the other hand, the user elects a trade use plan at the start, the use assignment of the resource 119 can be set as described, and the user may be charged for the trade use price, which can take into account the greater than normal (as compared to other trade user resources) quantities of replenishable material. By setting the use assignment of the resource 119, however, the resource 119 cannot be misappropriated from subscription use on one device to trade use on another device. This ensures that when the resource 119 is elected for subscription use at a lower subscription price (as compared to a comparable trade use price), it cannot be repurposed for trade use on a different device.

With respect to an example of FIG. 2, in variations, the resource 119 can form a subset of the total number of resources in use on the device at one time. Alternatively, the device 100 can utilize one type of resource 119 in place of another, selectively, based on, for example, user operation or preference (e.g., washing machine may utilize scented detergent in place of normal detergent on selective basis). In such variations, the device 100 may implement a different sequence or set of operations (as described with FIG. 2) for each type of resource 119 that is installed or in use with the device 100. For example, when the device 100 corresponds to a printer, the resource 119 can include a color ink cartridge and a black ink cartridge. The use of each type of cartridge for the device 100 can result in a separate set of operations, as described with FIG. 2, resulting in the device 100 having alternative configurations for utilizing different types of resources (e.g., subscription configuration for color ink and not black ink; subscription configuration for scented detergent but not normal detergent). Likewise, in some variations, different types of resources 119 which are used by the device 100 may have different use assignments. For example, the color cartridge of a printer can have a use assignment under a subscription plan, and the black ink cartridge may have a use assignment under the trade use.

Figure 3:
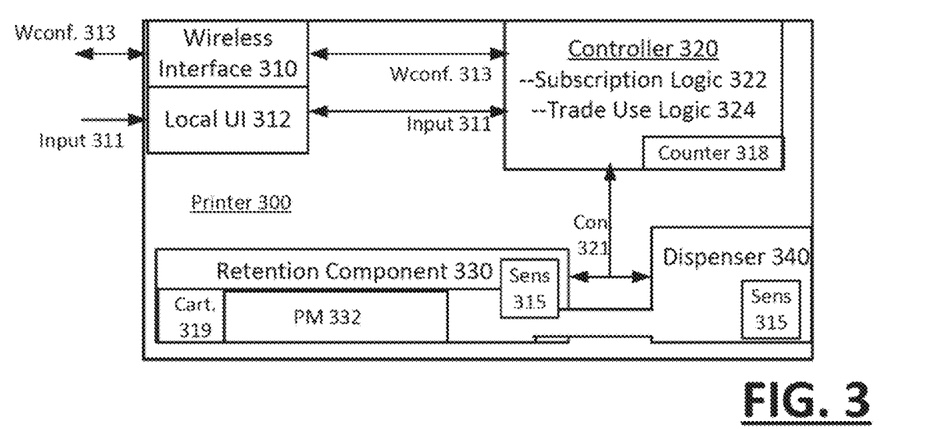
FIG. 3 illustrates an example printer which is operable to implement either of a subscription or trade use configuration while operating with existing printing material that is to be controlled under an elected configuration.

FIG. 3 illustrates an example printer which can be opted for either a subscription or trade use configuration for controlling use of replenishable printing material. As shown by an example of FIG. 3, a printer 300 can be implemented using any of the examples described with FIG. 1 or FIG. 2. Thus, for example, printer 300 may use printing material provided in cartridges that can be controlled or used as described with examples of FIG. 1 or FIG. 2.

With further reference to FIG. 3, the printer 300 can correspond to, for example, a toner-based printer, a liquid ink printer, or a solid ink printer. Accordingly, the printing material 332 can correspond to a toner, liquid ink, or powder. In some variations, the printer 300 can correspond to an additive manufacturing printer, which progressively or sequentially layers additive material in accordance with a three-dimensional layout, so as to form a structure or object. In these and other examples, the printing material 332 can correspond to additive material selected for the particular application, such as resin, nylon, metal, carbon filament, epoxies, polyurethanes, metals, hybrid materials, manufactured additive materials and the like. The printer 300 can include a retention component 330 for retaining a cartridge 319 of printing material 332. The cartridge 319 can have a variety of configurations, such as in the form of a canister, or pen. In some variations, the cartridge 319 can be provided as a set (e.g., multiple colors of printing material), or alternatively the cartridge can form a set with other cartridges. Still further, as described with other examples shown with FIG. 2, the cartridge 319 of the printing material 332 can carry information that is detectable to the controller 320. In this way, the cartridge 319 can carry information that identifies or relates to authenticity, type, or source of the printing material 332. For example, as described with other examples, the information can be carried on an exterior of the cartridge as a surface feature or characteristic. In variations, the cartridge 319 can carry information internally through use of a memory resource and communication interface (e.g., memory tag, not shown). As an addition or variation, the cartridge 319 can include information that identifies parameters which designate the cartridge 319 for a particular type of use or restriction. Still further, as also described with examples of FIG. 2, the cartridge 319 can be assigned internally to a particular use assignment, coinciding with a consumption plan that is elected for the printer.

In an example of FIG. 3, printer 300 includes a wireless interface 310, a local user interface 312, a controller 320, the retention component 330, and a dispenser 340. The wireless interface 310 can include, for example, a local wireless communication port such as provided by a Bluetooth type port (e.g., Bluetooth 2.0, Bluetooth 4.0, Bluetooth LE) or 802.11 (or Wi-Fi) type port (e.g., 802.11(a), 802.11(b), 802.11(g), 802.11(n), Wi-Fi Direct). Alternatively, the wireless interface 310 can include a cellular or WiMax type port for wide-area communications. The local user interface 312 can include, for example, a display or touchscreen (which can be displayed for features such as soft buttons), buttons and switches, and/or a microphone.

The controller 320 can be implemented as a processor (including in microprocessor), combination of processors, or integrated circuitry which implement logic as described. The controller 320 can communicate with a network service, or a combination of network services, using the wireless interface 310. The controller 320 can also communicate with a computing device of the user using the wireless interface 310. The user can also communicate with the printer 300 via the local user interface 312.

In an example of FIG. 3, the controller 320 can commit the printer to one of a subscription or trade use configuration, using corresponding subscription configuration logic 322 and/or trade use configuration logic 324. The controller 320 can determine whether to utilize the subscription logic 322 or trade use configuration logic 324 based on user input election 311, default selection (e.g., in absence of user election), or intelligent election (e.g., based on known usage habits or requirements for the printer 300). In an example of FIG. 3, the controller 320 can be in the non-committed state when there is a condition or event, such as the device having its first out-of-the-box use or factory reset. In this state, the printer 300 may have an installed print cartridge 319, while the printer itself has not yet been committed to either of the subscription or trade use configuration. Once the printer 300 subscription or trade use configuration is elected, the configuration is applied to the handling of the print cartridge 319 or resource that is installed.

Additionally, as described with examples of FIG. 2, the printer 300 can signal the cartridge 319 and/or network service 20 to set the use assignment of the cartridge 319 based on the elected consumption plan. In this way, the print cartridge is assigned for subscription or trade use after it is installed in the printer 300.

In one implementation, if the user elects for trade use, the controller 320 implements controls that remove use restrictions on the cartridge. The cartridge 319 can then become instantly available for use, without conditions of use. If the user elects subscription use, the controller 320 may implement the controls 321 to preclude or restrict use of the cartridge 319 until the controller 320 receives a communication (via the wireless interface 310) that confirms the user has enrolled in the subscription plan. In variations, when local input is received to elect the subscription plan, the controller 320 may implement the controls to allow access to the cartridge 319 for a limited time, after which the user may be precluded or restricted from accessing the cartridge until the controller 320 receives confirmation (e.g., from the network service 20 of FIG. 1). In implementation, when the controller 320 determines from user input or otherwise that the printer 300 is likely to be committed for subscription use, the controller 320 can monitor for receipt of a confirmation 313 from a network service (not shown) that manages the subscription. The confirmation 313 can be received over, for example, a network, using the wireless interface 310. If the confirmation 313 is not received within, for example, a given time period (e.g., after user input 311 indicates election of subscription configuration), the controller 320 can implement controls 321 to restrict operability of the dispenser 340 and/or access to the cartridge 319 of the printing material 332. As an addition or alternative, the controller 320 can permit certain types of use (e.g., test page print, limited page count print, black/white print but not color) and restrict others (e.g., large count, color etc.) while awaiting for the confirmation 313.

Additionally when the subscription configuration is implemented, a sensor set can monitor usage to ensure compliance with the subscription plan, and further detect when the depletion of the printing material 332 occurs so that the printing material 332 can be replenished from the subscription source automatically. The sensor set can include, for example, sensors 315 integrated with the retention component 330 and/or dispenser 340. In some variations, a use aggregator (or counter 318) can be implemented by the controller 320 to count pages, or quantify ink per page.

Still further, in some variations, when the subscription plan is selected, the controller 320 can have reporting or monitoring requirements to account for the usage amounts of the replenishable material (e.g., ink), specifically for compliance or accounting with the subscription plan. The reporting or monitoring may require the controller 320 to communicate subscription information 315 to the network service 20 (see FIG. 1) using the wireless interface 310. In such variations, the controller 320 may operate to track offline time, so that the subscription information can be reported to the network service 20. When the amount of offline time exceeds a given threshold, the controller 320 may disable or limit use of the cartridge until the device is online and/or the subscription information is reported. In this respect, an example provides that monitored offline time which exceeds a certain threshold (e.g., seven days) results in the implementation of a preclusive condition which precludes use of the print material until online communications are resumed.

In some variations, the printer 300 can have operability and use of the cartridge 319, printing material 332 and dispenser 340 while in the non-committed (e.g., where the configuration of the printer is not persistent, or not determined). In variations, the operability and use of the cartridge 319, printing material 332 and dispenser 340 when the printer 300 is in the non-committed state are restricted or precluded. For example, the user may be limited to printing test pages or print jobs that fit a limited size requirement (e.g., less than a given number of pages). Additionally, the restrictions and control can change over time. For example, when the non-committed state coincides with the printer 300 being new and out-of-the-box, an initial time period can enable usage with a first set of restrictions, but subsequent usage in a follow on time period (e.g., one week after the printer has been opened) can preclude or severely restrict further usage of the printer 300 until the user makes the election for implementing the subscription or trade use configuration.

Figure 4:
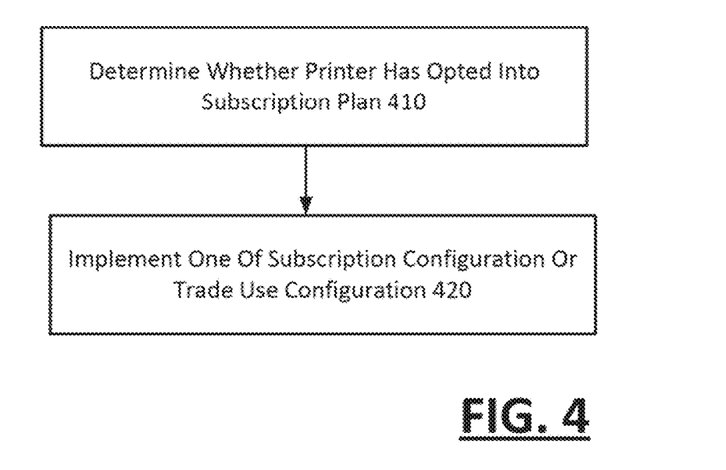
FIG. 4 illustrates an example method for operating a printer, as described with an example of FIG. 3.

FIG. 4 illustrates an example method for operating a printer, as described with an example of FIG. 3. In describing an example of FIG. 4, reference may be made to elements of FIG. 3 for purpose of illustrating a suitable component or set of components for performing a step or -sub-step being described.

In an example of FIG. 4, a printer makes a determination as to whether the printer is opted into or out of a subscription plan (410). The determination can be made when a printing material resource is installed in the printer. The controller 320 can, for example, monitor for user input with respect to the election. For example, the user can provide input through the local user interface 312, or use a computing device to communicate the input through the wireless interface 310. Alternatively, the controller 320 can make the determination based on default settings or using intelligence (e.g., determining information about the user).

One of a subscription configuration or trade use configuration may be implemented on the printer 300, based on the respective determination that the printer is opted into the subscription plan or out of the subscription plan (420). When the subscription configuration is implemented, the printer 300 restrictively controls, at least temporarily, use of the printing material resource. For example, the printer 300 may be restricted until confirmation is received that the user has enrolled. In a variation, the printer 300 may also be restricted if the user exceeds the subscription amount. When the trade use configuration is implemented, the printer provides for less or no control over the use of the printing material resource.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:
1. A printer comprising:
   a retention component to retain a resource of printing material;
   a dispenser to dispense a print layer on a medium using printing material of the resource;
   a controller to:
      make a determination as to whether the printer is opted into a subscription plan
      implement a subscription configuration, based on the respective determination that the printer is opted into the subscription plan;
      implement a trade use configuration, based on the respective determination that the printer is not opted into the subscription plan; and
      wherein the subscription configuration, when implemented, provides control of use of the resource of printing material comprising associating a use assignment with the resource of printing material, the use assignment permanently assigning the resource of printing material as subscription or trade use on any printer that installs the resource, and the trade use configuration, when implemented, provides lesser control of use of the resource of printing material, as compared to control provided with the subscription configuration.

2. The printer of claim 1, wherein the controller determines that the printer is enrolled in the subscription plan by receiving a confirmation from a network source that manages the subscription plan.

3. The printer of claim 1, wherein the controller implements the subscription configuration by determining when a preclusive condition is present, and limiting operability of the dispenser when the preclusive condition is present.

4. The printer of claim 3, wherein the preclusive condition comprises an absence of a confirmation that the printer is enrolled in the subscription plan, after when a user action is detected that is indicative of the user opting the printer for the subscription plan.

5. The printer of claim 3, wherein the preclusive condition comprises the printer being offline for a duration that exceeds a predetermined threshold.

6. The printer of claim 3, wherein the preclusive condition is based on communications received from a network source that manages the subscription plan.

7. The printer of claim 1, wherein the controller implements the trade use configuration to permit replacement of the resource of printing material based on a source, type or designation of source of a replacement resource.

8. The printer of claim 1, wherein the controller permits continued use of the resource of printing material by the dispenser until a limit is reached.

9. The printer of claim 1, wherein in the subscription configuration, the controller monitors a quantity of print material that is consumed, and enables the dispenser based at least in part on the consumed quantity.

10. The printer of claim 1, wherein the retention component retains multiples types of printing material, and wherein the controller makes the determination and implements one of the subscription or trade use configuration separately for each type of printing material.

11. The printer of claim 1, wherein the controller:
detects an out-of-the box event,
performs monitoring for the user-election, and
implements the subscription configuration based on the respective determination that the printer is opted into the subscription plan as part of an out-of-the-box process.

12. A method for utilizing a printer, the method comprising:
making a determination as to whether the printer is opted into a subscription plan
implementing a subscription configuration, based on the respective determination that the printer is opted into the subscription plan, rather than a trade use configuration;
wherein the subscription configuration, when implemented, provides control of use of the resource of printing material comprising associating a use assignment with the resource of printing material, the use assignment permanently assigning the resource of printing material as subscription or trade use on any printer that installs the resource, and the trade use configuration, when implemented, provides lesser control of use of the resource of printing material, as compared to control provided with the subscription configuration.

13. The method of claim 12, wherein at least associating the use assignment is performed on a network service that communicates with the printer to determine when the printer is opted into the subscription plan.

14. A non-transitory computer-readable medium that stores a set of instructions, which when executed by a processing resource of a computer system, causes the computer system to perform operations comprising:
making a determination as to whether a printer is opted into a subscription plan;
if the printer is determined to be opted into the subscription plan, causing implementation of a subscription configuration that controls the printer with respect to use of a resource of printing material that is available for use with the printer;
if the printer is opted out of the subscription plan, causing implementation of a trade use configuration that provides for less or no control of the resource of printing material; and
associating a use assignment with the resource of printing material, the use assignment permanently assigning the resource of printing material as subscription or trade use on any printer that installs the resource.

* * * * *

UNITED STATES PATENT AND TRADEMARK OFFICE
CERTIFICATE OF CORRECTION

PATENT NO.        : 10,348,923 B2
APPLICATION NO.   : 15/737114
DATED             : July 9, 2019
INVENTOR(S)       : Sovrin T Tolia et al.

Page 1 of 1

It is certified that error appears in the above-identified patent and that said Letters Patent is hereby corrected as shown below:

On the Title Page

In item (72), Inventors, in Column 1, Line 2, delete "Portlanf," and insert -- Portland, --, therefor.

Signed and Sealed this
Third Day of December, 2019

Andrei Iancu
*Director of the United States Patent and Trademark Office*